(12) United States Patent
Muelken

(10) Patent No.: US 7,980,201 B2
(45) Date of Patent: Jul. 19, 2011

(54) PET RESTRAINT SYSTEM

(76) Inventor: David Muelken, New York, NY (US)

( * ) Notice: Subject to any disclaimer, the term of this patent is extended or adjusted under 35 U.S.C. 154(b) by 685 days.

(21) Appl. No.: 12/047,843

(22) Filed: Mar. 13, 2008

(65) Prior Publication Data

US 2009/0229537 A1    Sep. 17, 2009

(51) Int. Cl.
*A01K 27/00* (2006.01)
(52) U.S. Cl. .................. 119/792; 119/794
(58) Field of Classification Search .............. 119/769, 119/770, 771, 772, 792, 793, 794, 795, 796, 119/797, 798, 856, 863, 865; 24/614, 615, 24/625, 629; 70/30, 312, 14, 18, 19; D8/333, D8/343
See application file for complete search history.

(56) References Cited

U.S. PATENT DOCUMENTS

| | | | | |
|---|---|---|---|---|
| 2,065,946 A * | 12/1936 | Mader | | 24/180 |
| 3,867,905 A * | 2/1975 | Vail, Jr. | | 119/793 |
| 4,398,500 A * | 8/1983 | Koronkiewicz | | 119/793 |
| 4,621,589 A * | 11/1986 | Thinnes | | 119/770 |
| 4,932,362 A * | 6/1990 | Birchmire et al. | | 119/772 |
| 5,117,663 A * | 6/1992 | Ida | | 70/64 |
| 5,517,836 A * | 5/1996 | Hong | | 70/30 |
| 5,595,143 A * | 1/1997 | Alberti | | 119/794 |
| 5,722,351 A * | 3/1998 | Roper | | 119/795 |
| 6,095,094 A * | 8/2000 | Phillips | | 119/792 |
| 6,205,956 B1 * | 3/2001 | Dickie et al. | | 119/792 |
| 6,532,903 B2 | 3/2003 | Prusia et al. | | |
| 6,715,449 B1 * | 4/2004 | Jordan | | 119/863 |
| 2005/0126510 A1 * | 6/2005 | O'Neill | | 119/771 |

* cited by examiner

*Primary Examiner* — T. Nguyen
(74) *Attorney, Agent, or Firm* — Dale J. Ream

(57) ABSTRACT

A pet restraint system includes a collar having first and second ends and having a first lock configured to restrict separation of the first and second ends. The system includes an elongate leash having a clip at a first end for removable attachment to the collar and having a second lock to restrict removal of the clip from the collar. The system includes a handle coupled to a second end of the leash and having a protrusion movable between release and hold positions. The handle includes a third lock for restricting movement of the protrusion from the hold position. The handle further includes a retracting mechanism coupled to the leash to selectively retract the leash to a plurality of retraction positions.

5 Claims, 13 Drawing Sheets

PET RESTRAINT SYSTEM

BACKGROUND OF THE INVENTION

This invention relates generally to pet restraints and, more particularly, to a pet restraint system that prevents a pet's collar from being removed, that locks a leash to a pet's collar, and that includes a leash lock for selectively locking a leash to another object.

One of a pet owner's greatest concerns is that his pet will become lost or stolen. A pet may be stolen even when its leash is tied to another object in that a thief may completely remove a pet's collar to which the leash is attached. Even if the collar is not removed, both the leash and the pet may be stolen together if the leash and pet are merely tied to another object and the owner is not present. Further, the inclusion of locks on a collar or leash is irrelevant if a thief has sufficient tools to cut though or otherwise remove a pet's collar Various devices have been proposed in the art for preventing the theft of a pet, such as with devices for locking a leash to an object. Proposals for locking devices relevant to pet restraints are found in U.S. Pat. Nos. 6,095,094, 6,371,056, 5,462,019, and 6,269,777. Although assumably effective for their intended purposes, the existing devices do not provide a combination of locking mechanisms for locking a collar to a pet (preventing unwanted collar removal), locking a leash to a collar, and locking a leash to another object.

Therefore, it would be desirable to have a pet restraint system that prevents a pet collar from being removed from a pet, provides a leash lock that locks a leash to a collar, and enables a leash to be locked to another object apart from the restraint system.

SUMMARY OF THE INVENTION

Therefore, a pet restraint system according to the present invention includes a flexible collar having first and second ends. A fastener is configured to selectively secure together the first and second collar ends so as to present an adjustable circumference for encircling a portion of a pet. The fastener includes a first lock configured to restrict separation of the first and second collar ends. The pet restraint system further includes an elongate leash having first and second ends. A clip is permanently coupled to the least first end and is configured to removably attach the lest first end to the collar. A second lock is included and configured to restrict removal of the clip from the collar.

The pet restraint system further includes a handle that is permanently coupled to the leash second end. The handle includes a retracting mechanism coupled to the leash second end so as to selectively retract the leash to a plurality of retraction positions. The handle further includes a leash catch movable between a release position and a hold position, the leash catch interacting with at least one of the leash and retracting mechanism when at the hold position to secure the leash at a respective retracted position. The handle includes a protrusion configured to restrain the leash only when at the hold position. In addition, the handle includes a third lock configured to restrict movement of the leash catch from the hold position and restrict movement of the protrusion from the hold position.

Therefore, a general object of the present invention is to provide a pet restraint system that properly restrains a pet while minimizing the risk of the pet being stolen.

Another object of the present invention is to provide a pet restraint system, as aforesaid, that prevents unauthorized removal of a pet's collar.

Still another object of the present invention is to provide a pet restraint system, as aforesaid, that prevents unauthorized removal of a leash from a pet's collar.

Yet another object of the present invention is to provide a pet restraint system, as aforesaid, that prevents unauthorized removal of a leash secured to a stationary object.

A further object of the present invention is to provide a pet restraint system, as aforesaid, having a retractable leash for comfortable and convenient walking of a pet.

A still further object of the present invention is to provide a pet restraint system, as aforesaid, that prevents the leash from being removably cut.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 5b is an isolated view on an enlarged scale taken from a portion of FIG. 5a;

FIG. 6 is an exploded view of the casing as in FIG. 5a;

FIG. 11b is a sectional view taken along line 11b-11b of FIG. 11a;

FIG. 13 is a fragmentary view of the handle as in FIG. 3a.

DESCRIPTION OF THE PREFERRED EMBODIMENT

A pet restraint system will now be described in detail with reference to FIG. 1 through FIG. 13 of the accompanying drawings. More particularly, the pet restraint system 100 includes a flexible collar 110.

Figure 7:
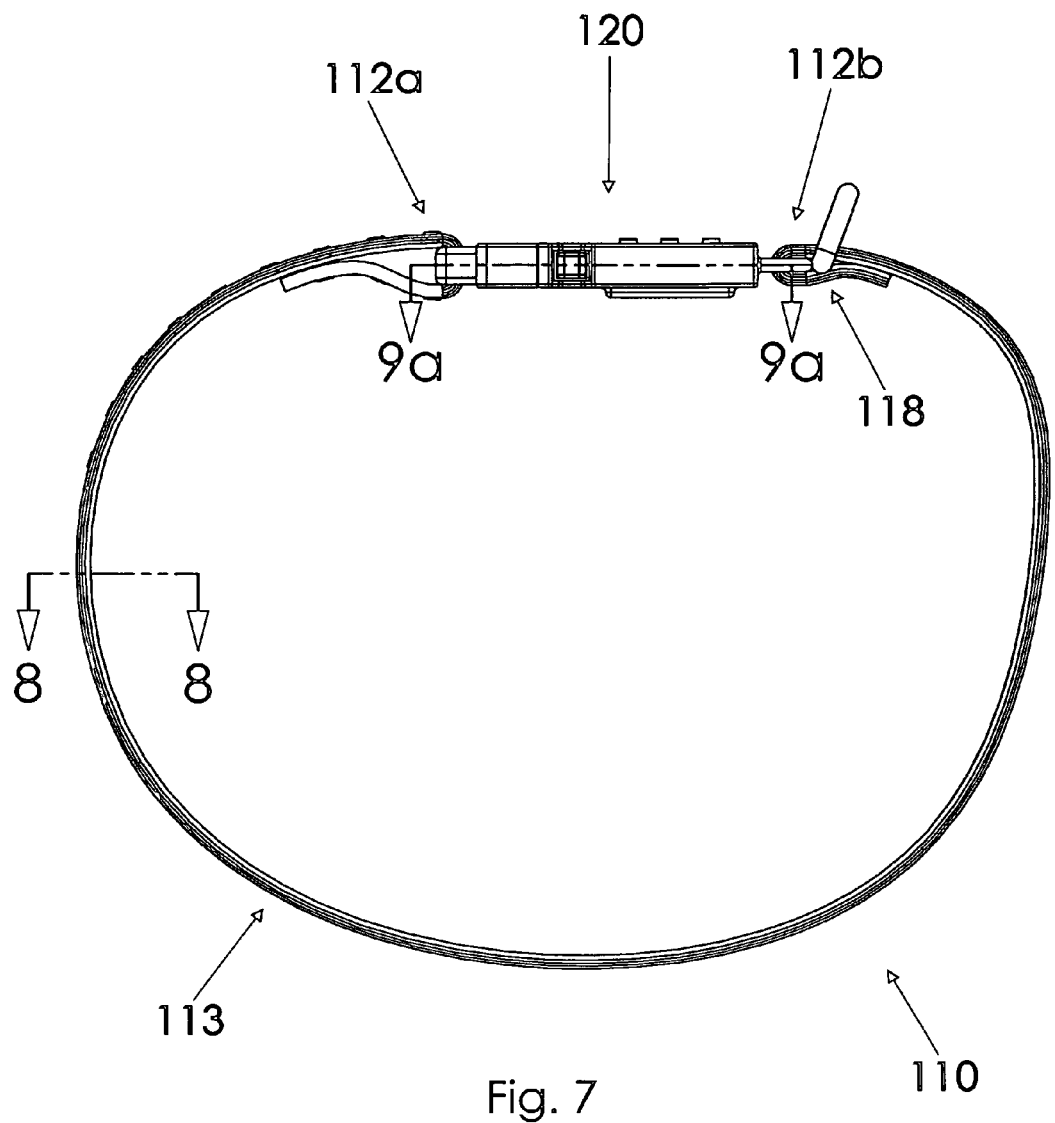
FIG. 7 is a top view of the collar as in FIG. 1.

As shown in FIG. 7, the flexible collar 110 has first and second ends 112a, 112b. A fastener 120 is configured to selectively secure together the first and second ends 112a, 112b of the collar 110 to present an adjustable circumference 113 for encircling a portion of a pet (e.g., a dog's neck). The fastener 120 includes a lock 128 (FIG. 1) configured to restrict separation of the first and second collar ends 112a, 112b. The collar 110 may include a cut-resistant material 114

Figure 8:
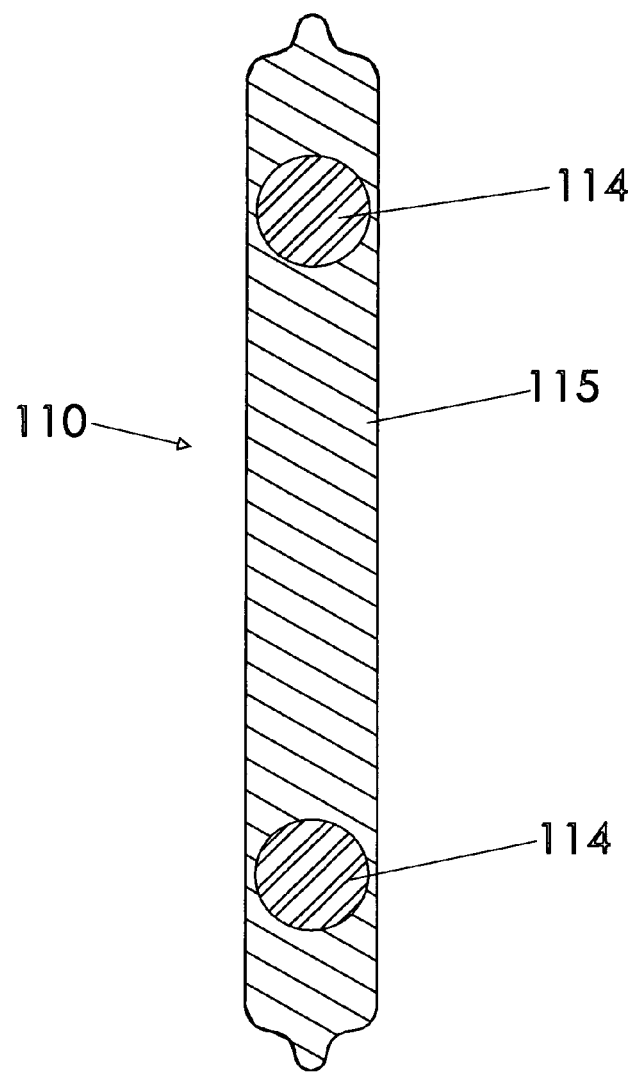
FIG. 8 is a sectional view taken along line 8-8 of FIG. 7.

(e.g., metal, etc.) permanently affixed within an outer member 115 (e.g., cloth, soft plastic, etc.), as shown in FIG. 8.

Figure 5A:
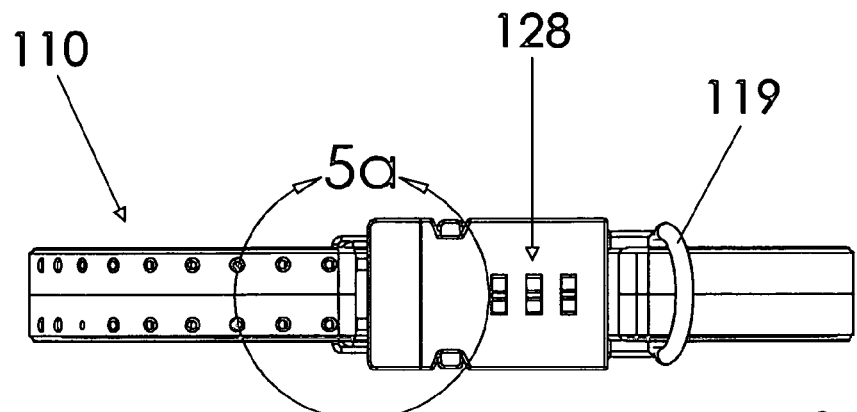
FIG. 5a is front view of the collar and casing as in FIG. 1.
Figure 5B:
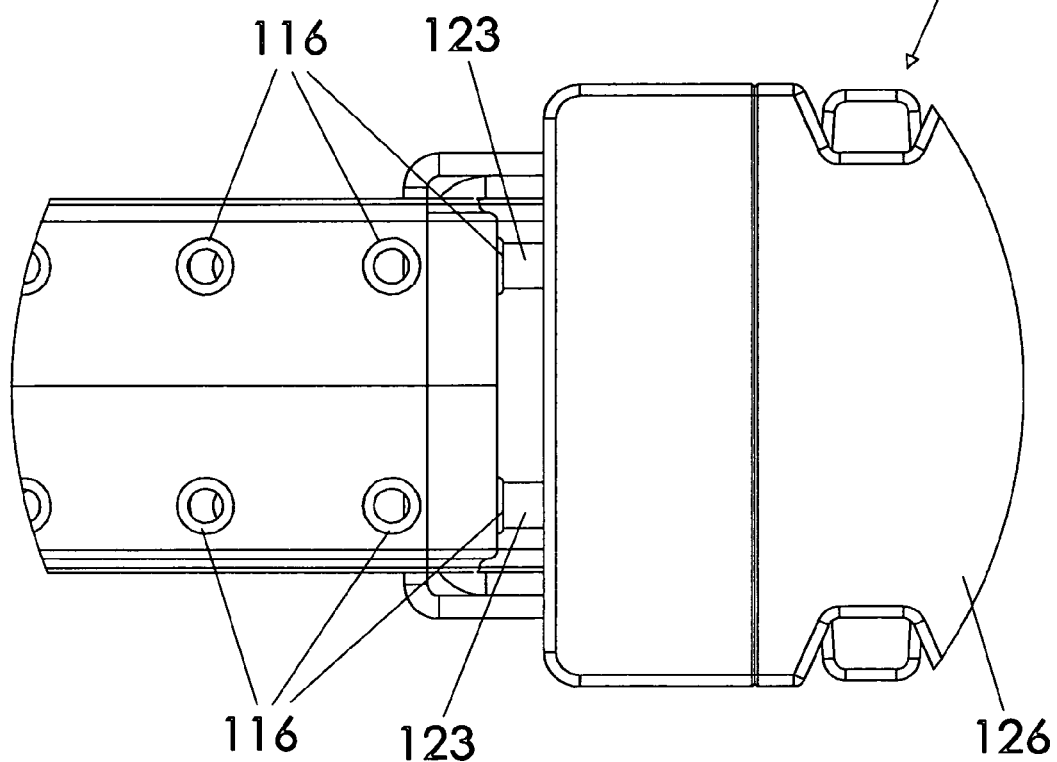
Figure 6:
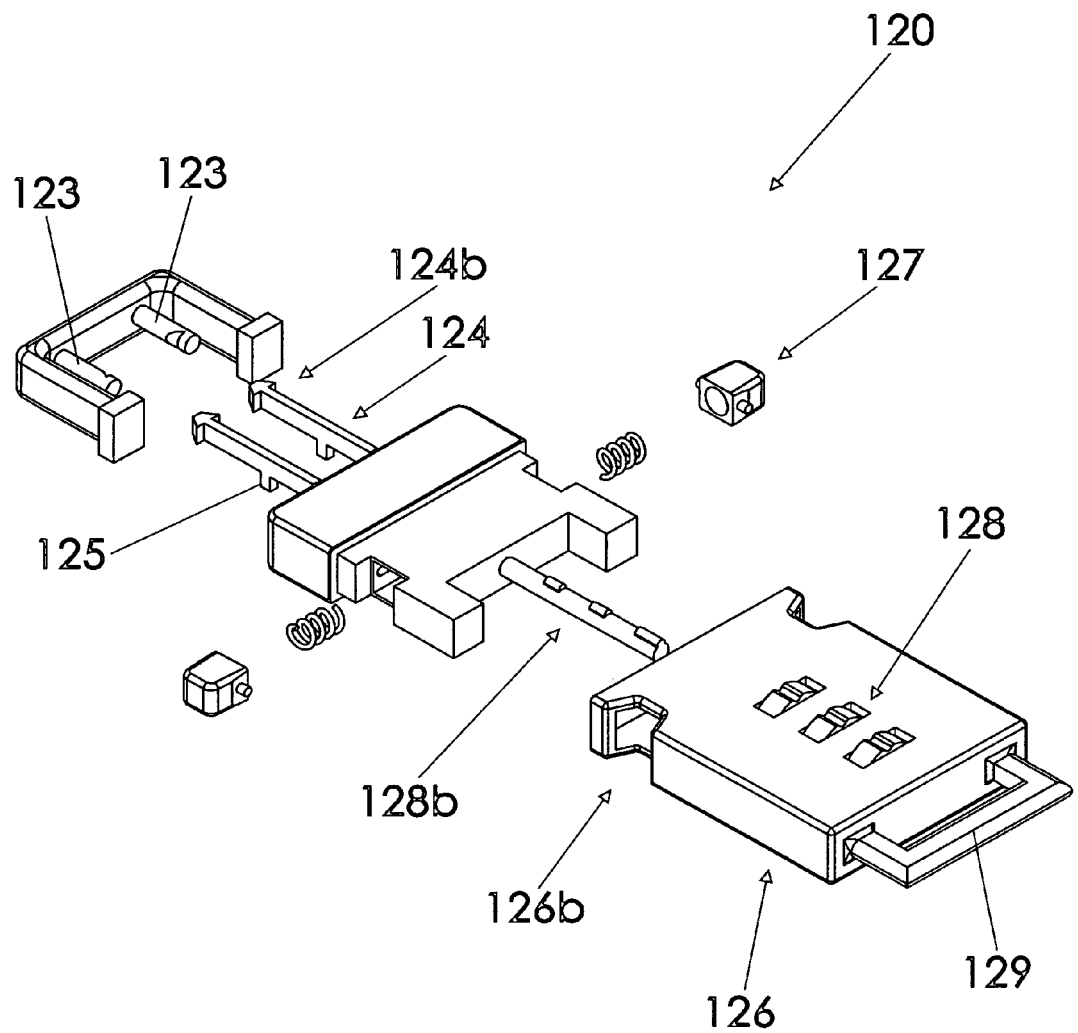
Figure 9A:
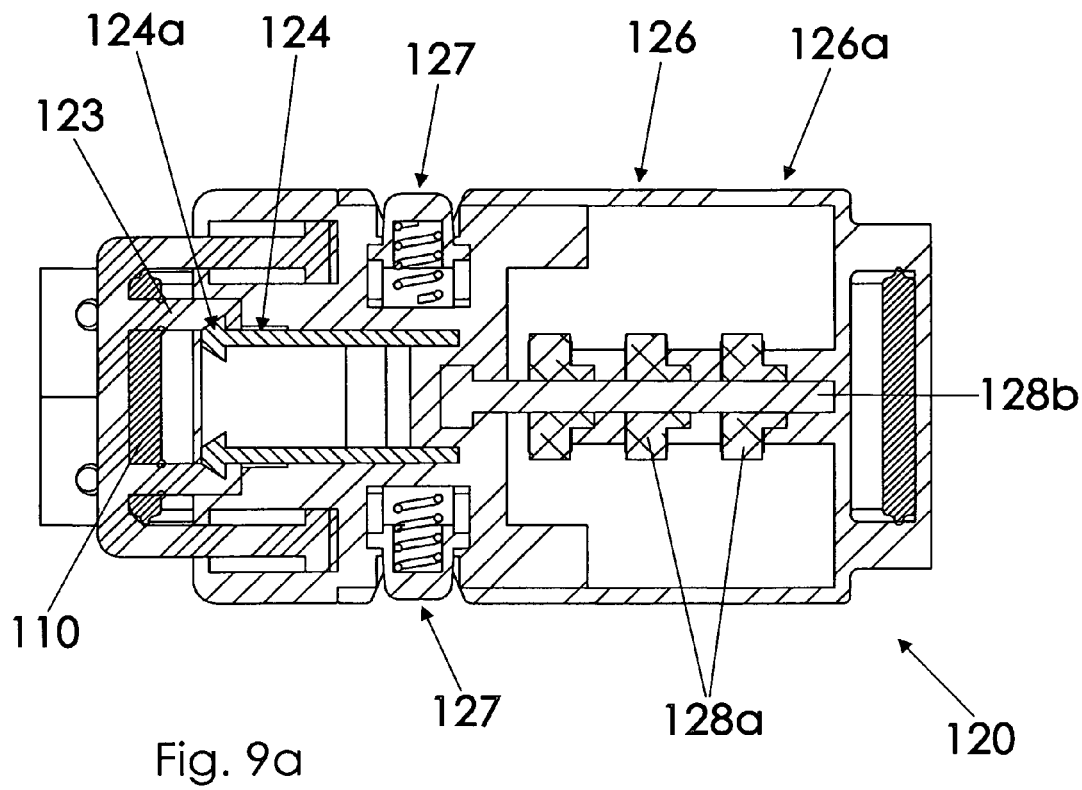
FIG. 9a is a sectional view taken along line 9a-9a of FIG. 7, with the casing shown in a locked configuration.
Figure 9B:
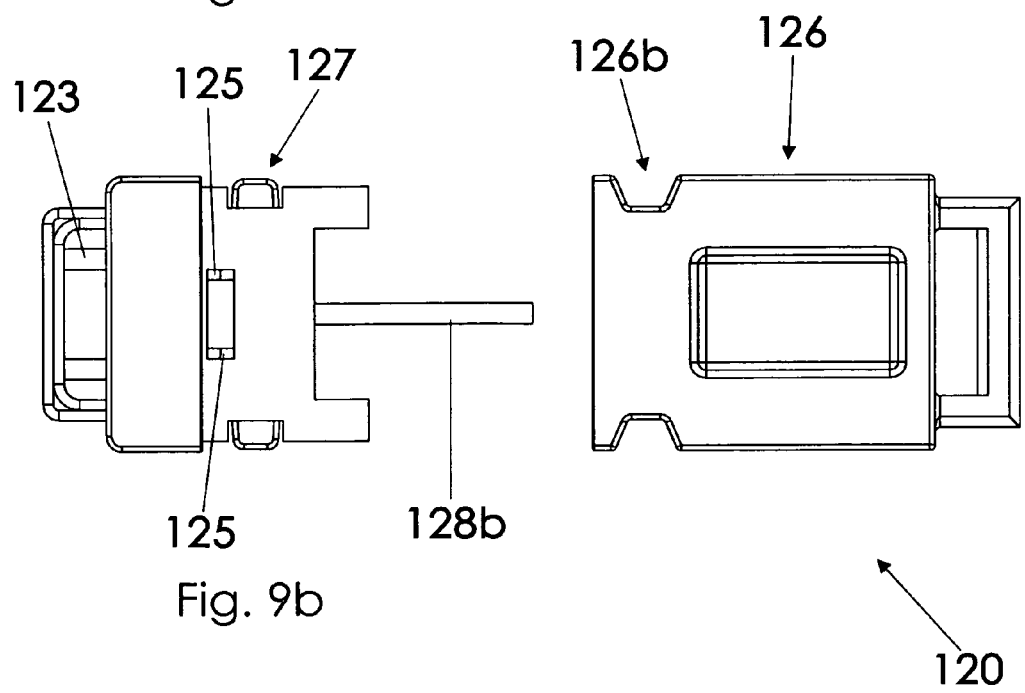
FIG. 9b is a back view of the casing as in FIG. 1.

In one embodiment (as shown in FIGS. 5b and 6, for example), the collar 110 includes a plurality of holes 116 between the first and second ends 112a, 112b and the fastener 120 includes a pin 123 configured to respectively interact with the holes 116. By respectively interacting the with holes 116, the pin 123 may secure the adjustable collar circumference 113 at any of a plurality of respective positions. A clasp 124 may be configured to secure the pin 123 when at a first position 124a (FIG. 9a) and release the pin 123 when at a second position 124b (FIG. 6). As shown in FIGS. 9a and 9b, an outer casing 126 may be movable between a closed configuration 126a (FIG. 9a) and an open configuration 126b (FIG. 9b) in which the clasp 124 is exposed. A lock 128 (e.g., a combination lock with tumblers 128a and a tumbler pin 128b) may be operatively coupled to the outer casing 126 to restrict movement of the outer casing 126 from the closed configuration 126a to the open configuration 126b, and the clasp 124 may be movable to the second position 124b only when the outer casing 126 is at the open configuration 126b. More particularly, the clasp 124 may be biased toward the first configuration 124a, and a portion 125 (FIG. 6) of the clasp 124 (or a separate element in communication with the clasp 124) may only be accessed when the outer casing 126 is at the open configuration 126b (FIG. 9b). The fastener 120 may additionally include a spring-biased push button 127 that operatively engages the outer casing 126 to restrict movement of the outer casing 126 from the closed configuration 126a to the open configuration 126b, as shown in FIGS. 6, 9a, and 9b.

Figure 10A:
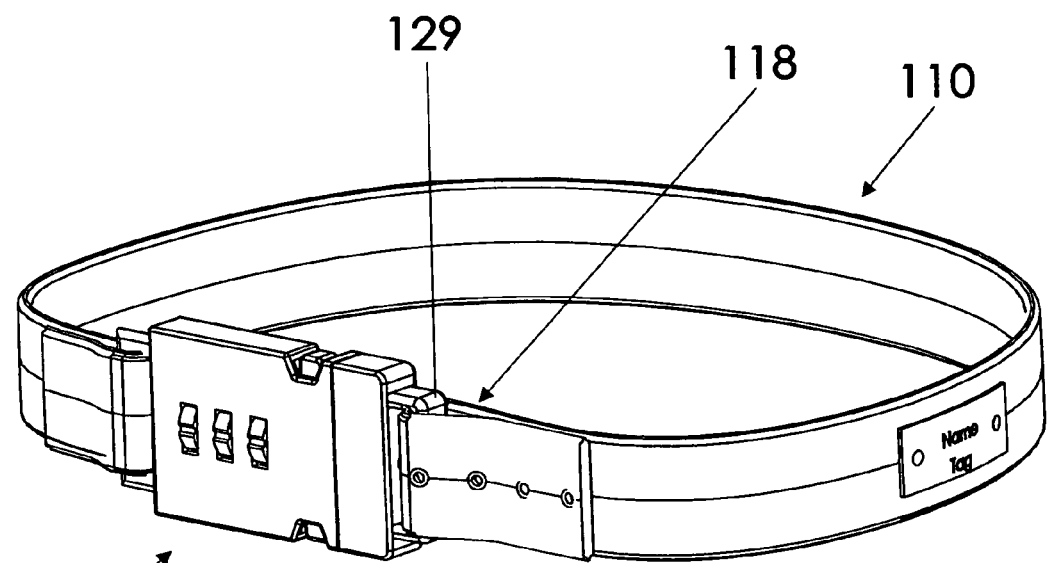
FIG. 10a is front elevation view of the collar of FIG. 1 removed from the remainder of the pet restraint system.
Figure 10B:
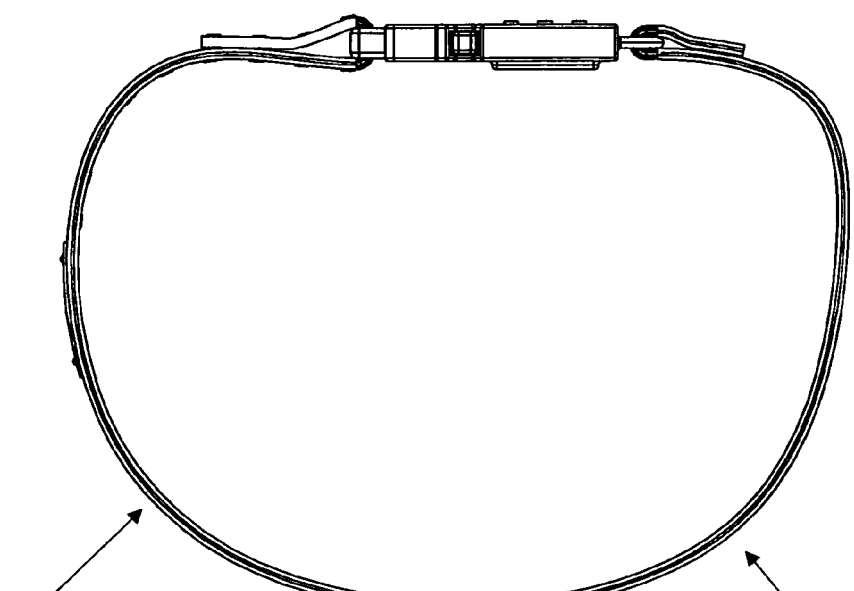
FIG. 10b is another top view of the collar as in FIG. 7.
Figure 11A:
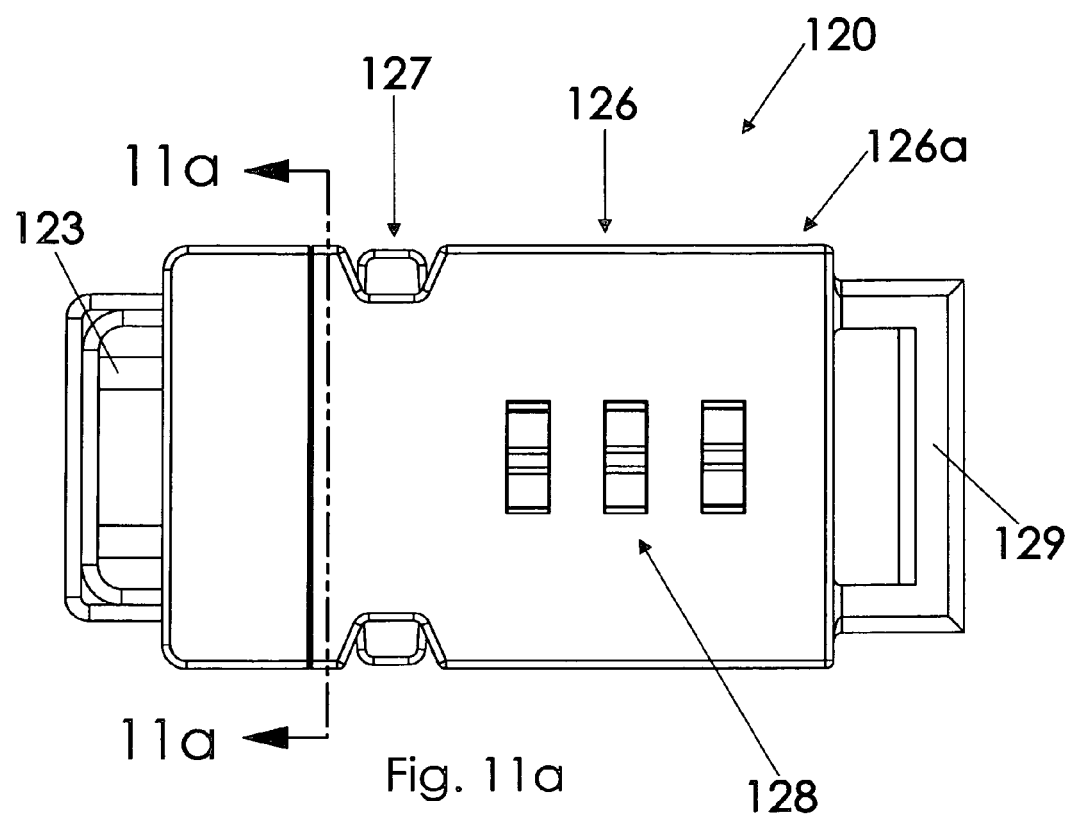
FIG. 11a is a front side view of the casing and first lock as in FIG. 5a and showing the casing in a locked configuration.
Figure 11B:
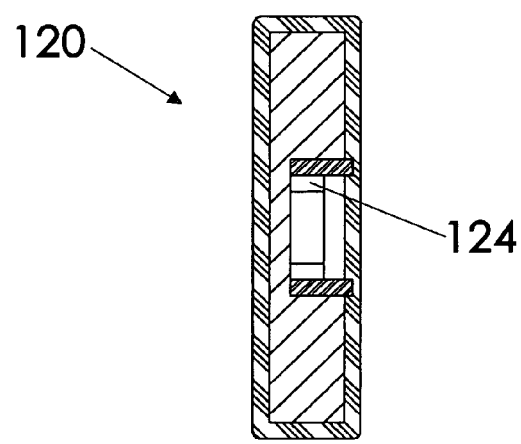
Figure 12A:
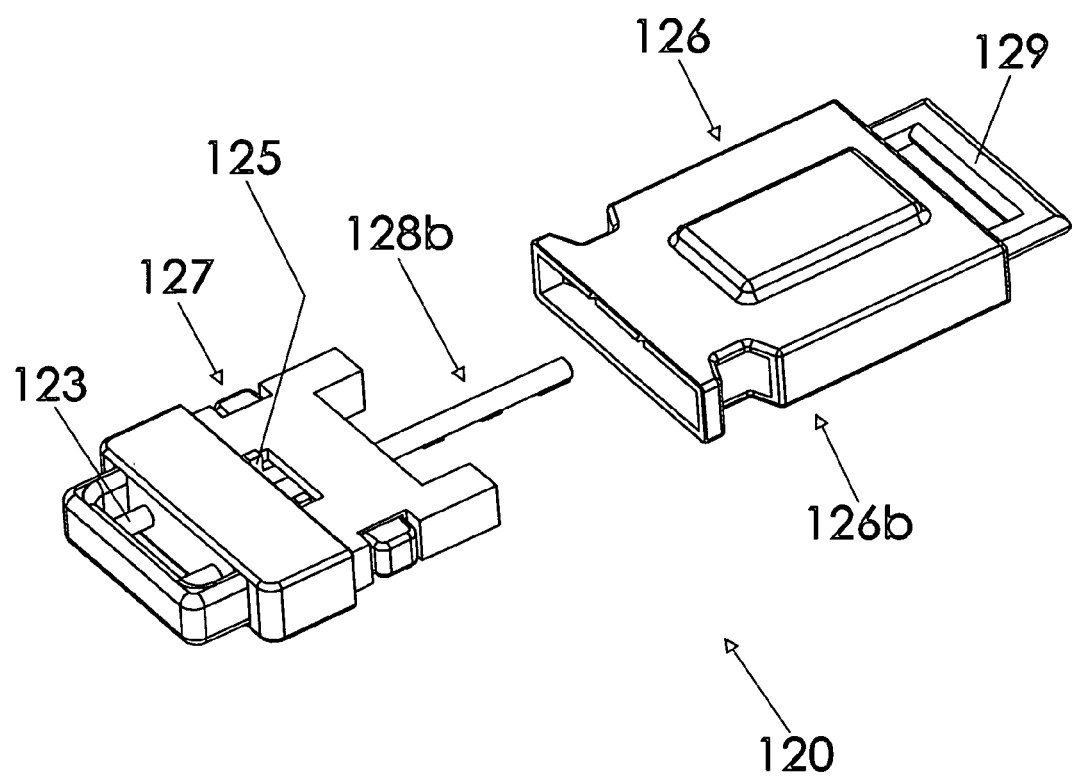
FIG. 12a is a perspective view of the casing in a released configuration.

As shown in FIGS. 7 and 10a, the second end 112b of the collar 110 may define a loop 118, the fastener 120 may include a hoop 129, and the hoop 129 may interact with the collar loop 118 to couple the fastener 120 to the collar 110. Any other method of fastening the collar 110 to the fastener 120 may also be acceptable.

Figure 1:
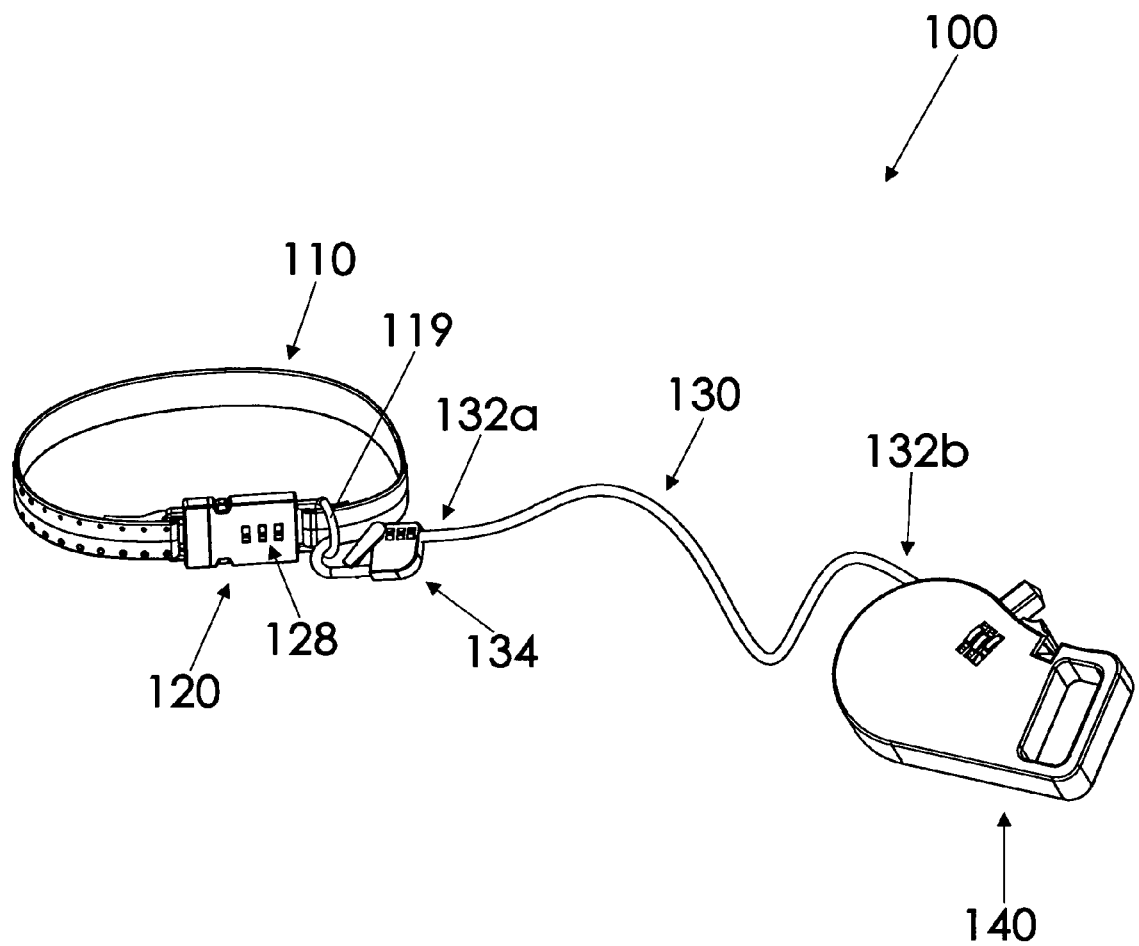
FIG. 1 is a perspective view of a pet restraint system according to a preferred embodiment of the present invention.
Figure 2:
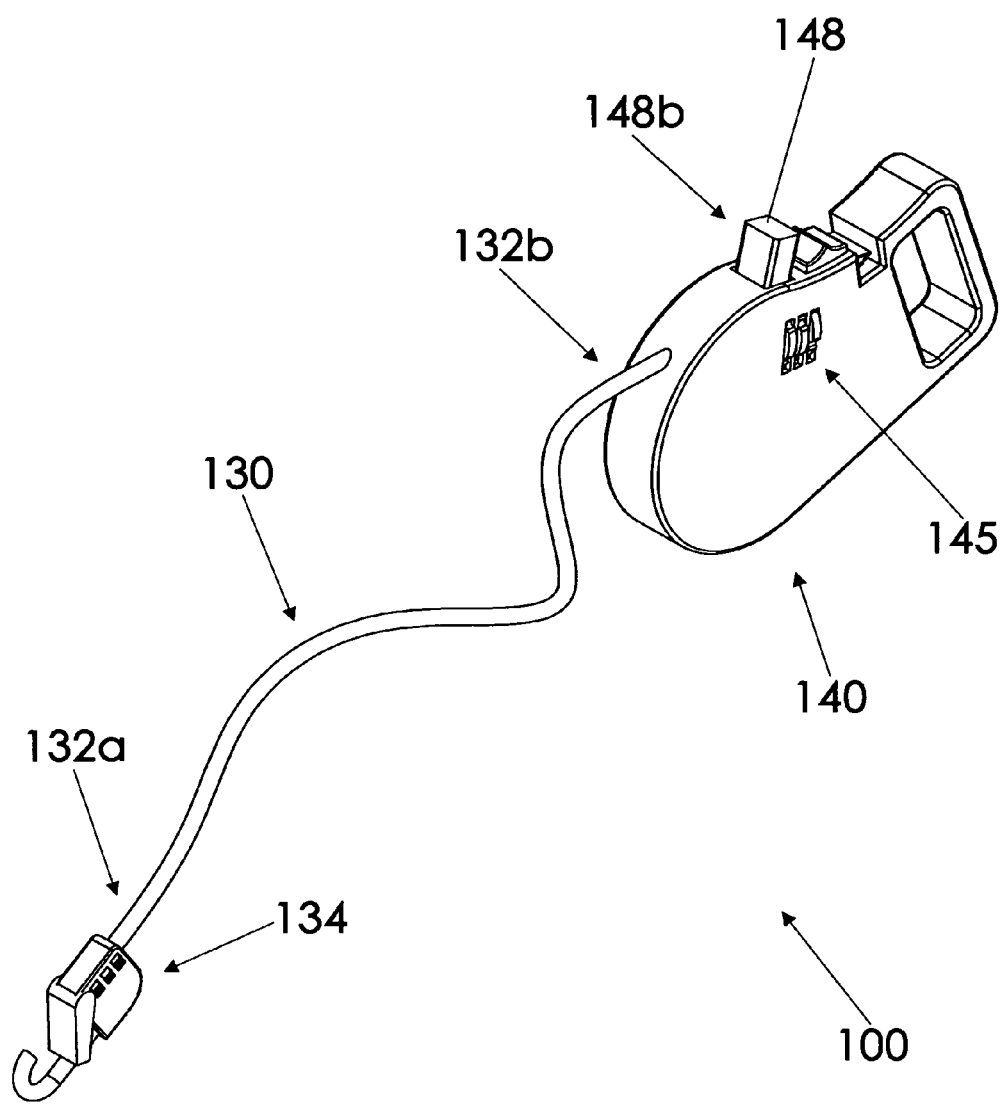
FIG. 2 is another perspective view of the pet restraint system as in FIG. 1 with the collar removed.
Figure 4A:
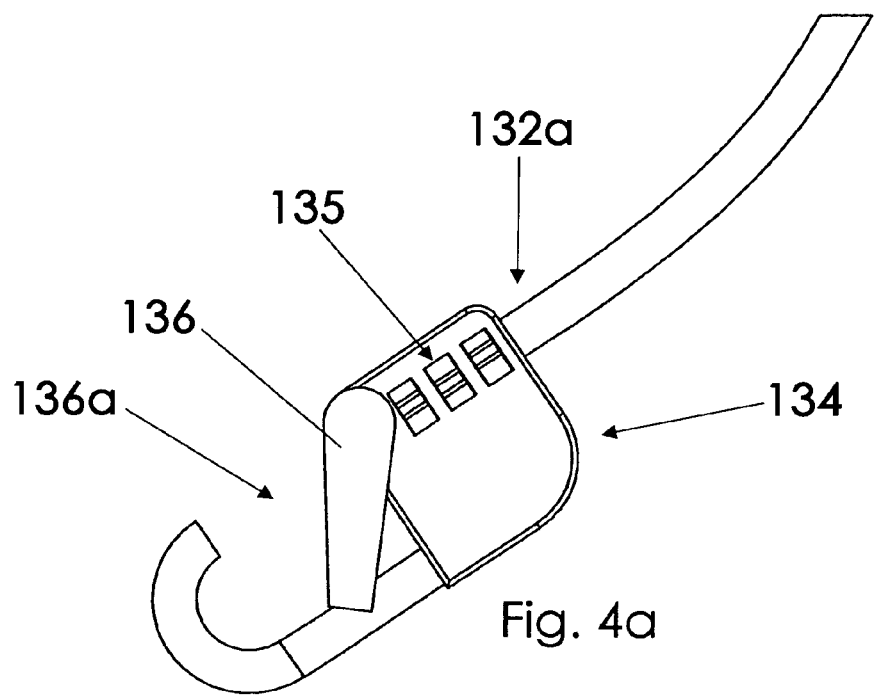
FIG. 4a is a side view on an enlarged scale of a clip as in FIG. 2 with a clip arm in an open configuration.
Figure 4B:
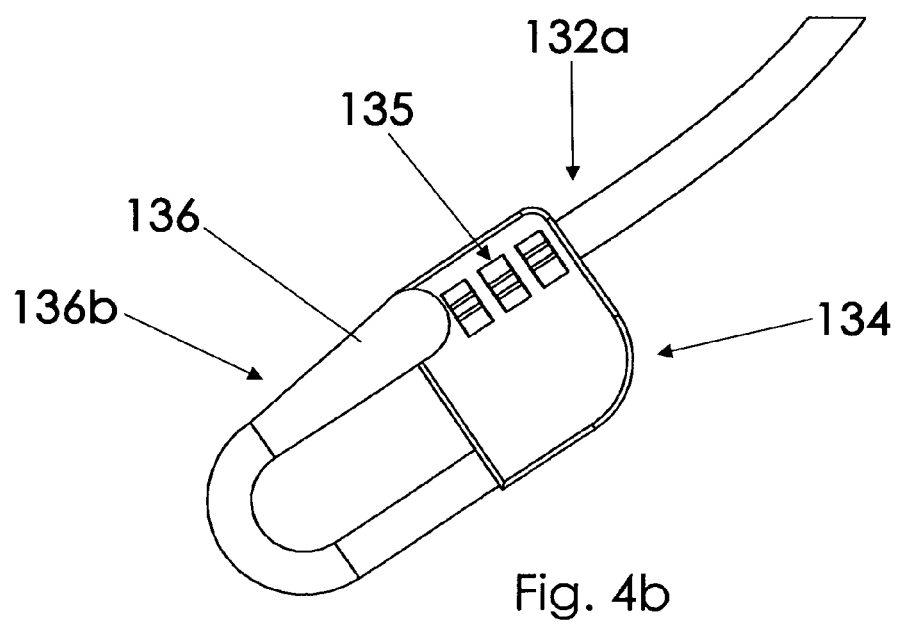
FIG. 4b is another side view as in FIG. 4a with the clip arm in a closed configuration.

The pet restraint system 100 may include an elongate leash 130 (FIG. 1) having first and second ends 132a, 132b, and a clip 134 may be permanently coupled to the leash first end 132a. The clip 134 may be configured to removably attach the leash first end 132a to the collar 110, as shown in FIG. 1, and a lock 135 (e.g., a combination lock) may be configured to restrict removal of the clip 134 from the collar 110. In one embodiment, as shown in FIGS. 4a and 4b, the clip 134 includes an arm 136 movable between an open configuration 136a (FIG. 4a) and a closed configuration 136b (FIG. 4b) and the lock 135 is configured to restrict movement of the clip arm 136 from the closed configuration 136b. The collar 110 may include a ring 119, as shown in FIGS. 1 and 5a, and the clip 134 may be configured to removably attach the leash first end 132a to the collar ring 119, or the clip may otherwise attach the leash first end 132a to the collar 110.

Figure 3A:
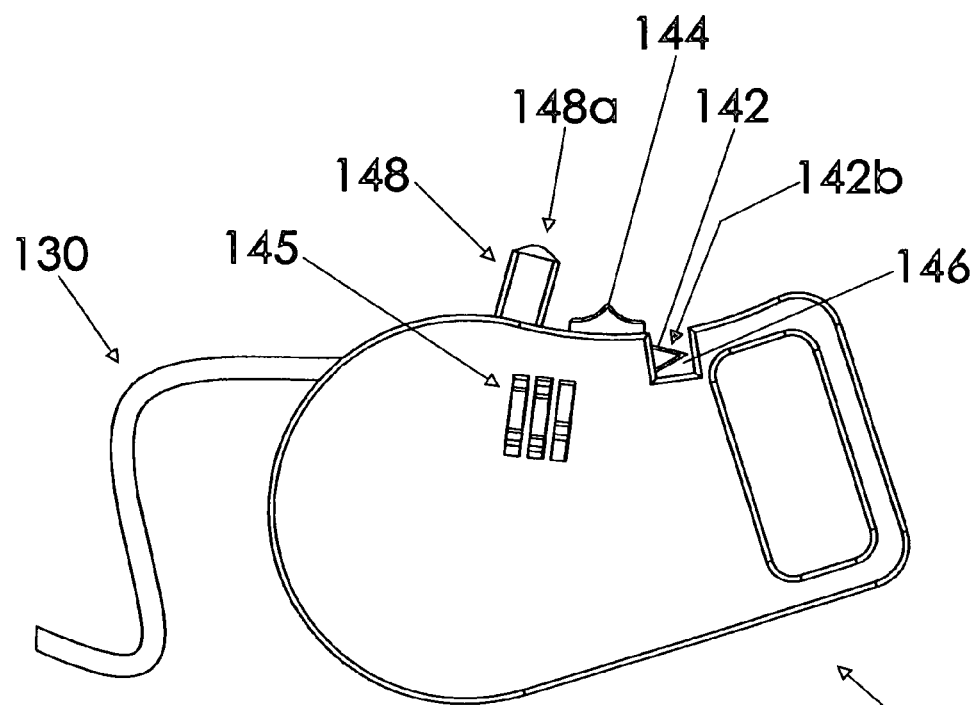
FIG. 3a is an side view on an enlarged scale of the handle as in FIG. 2 with the protrusion in a hold position.
Figure 3B:
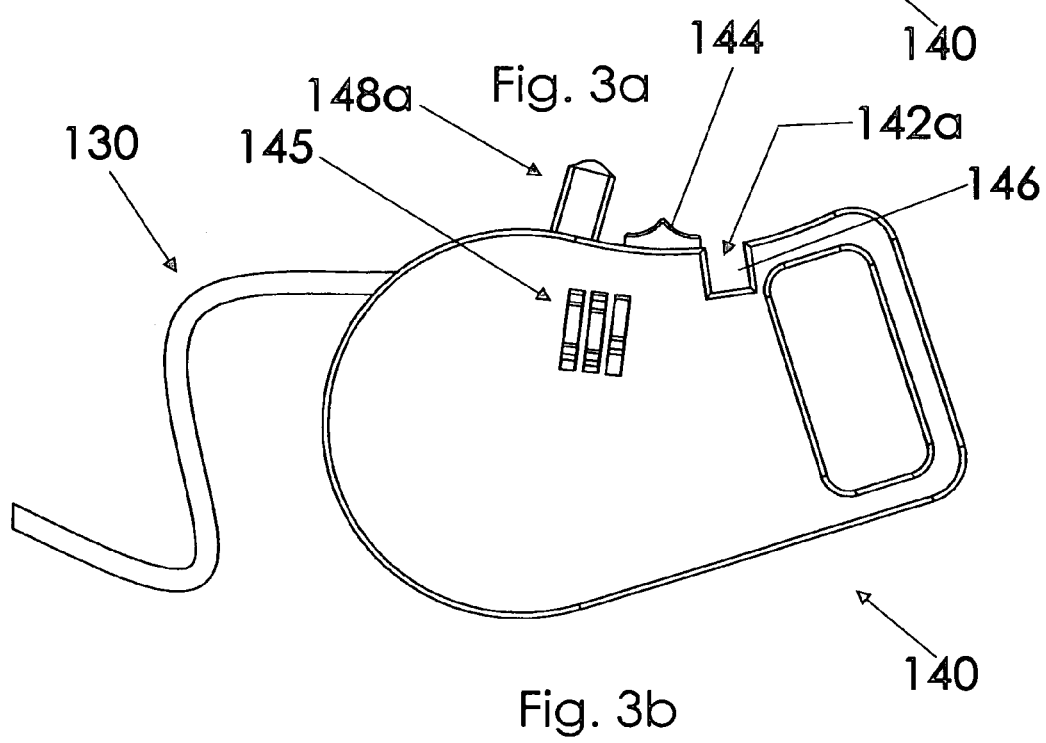
FIG. 3b is side view of the handle as in FIG. 3a with the protrusion in a release position.

As shown in FIGS. 1 through 3b, a handle 140 may be permanently coupled to the leash second end 132b. The handle 140 includes a protrusion 142 movable between a release position 142a and a hold position 142b, and the protrusion 142 is configured to restrain the leash 130 only when at the hold position 142b. A lock 145 (e.g., a combination lock) is configured to restrict movement of the protrusion from the hold position 142b, and a button 144 may be used to move the protrusion 142 to the hold position 142b. In one embodiment, as shown in FIGS. 3a and 3b, the handle 140 defines a cavity 146 and the protrusion 142 extends at least partially across the cavity 146 when at the hold position 142b (FIG. 3a) to restrain the leash 130 in the cavity 142.

Figure 13:
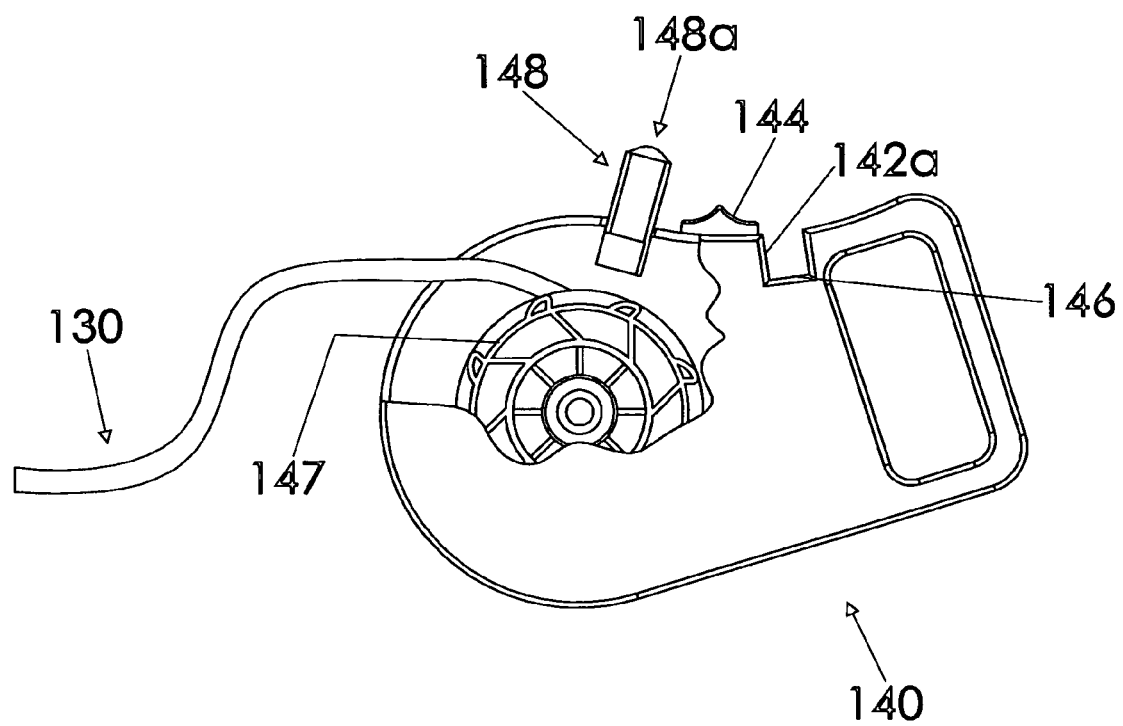

The handle 140 may include a retracting mechanism 147 coupled to the leash 130 to selectively retract the leash to a plurality of retraction positions, as shown in FIG. 13. In other words, the retracting mechanism 147 may alter the length of the portion of the leash 130 that extends outside the handle 140. A leash catch 148 may be movable between a release position 148a (FIGS. 3a and 3b) and a hold position 148b (FIG. 2), and the leash catch 148 may interact with the leash 130 and/or the retracting mechanism 147 when at the hold position 148b to secure the leash 130 at a respective retraction position (i.e., to temporarily determine the length of the portion of the leash 130 that extends outside the handle 140). The lock 145 or another lock may restrict movement of the leash catch 148 from the hold position 148b.

In use, the collar 110 is placed about an animal's neck (or at another desired position) and the fastener 120 secures together the first and second ends 112a, 112b of the collar 110. As detailed above, the pin 123 may interact with a chosen hole 116 in the collar 110, the clasp 124 may secure the pin 123 in place, and the outer casing 126 may enclose the clasp 124. The lock 128 and/or the spring-biased push button 127 may restrict movement of the outer casing 126 from the closed configuration 126a. To remove the collar 110, the lock 128 may be unlocked (e.g., by entering a proper combination) and the push-button 127 may be pressed to move the outer casing 126 to the open configuration 126b, and the clasp 124 may be moved to the second position 124b (FIG. 6) to release the pin 123.

The clip 134 may be coupled to the collar 110 (e.g., at the collar ring 119), and the lock 135 may restrict removal of the clip 134 from the collar 110. As detailed above, the clip arm 136 may be moved between the open and closed configurations 136a (FIG. 4a), 136b (FIG. 4b) to attach the clip 134 to the collar 110, and the lock 135 may restrict movement of the clip arm 136 from the closed configuration 136b. To separate the clip 134 from the collar 110, the lock 135 may be unlocked (e.g., by entering a proper combination), and the clip arm 136 may be moved from the closed configuration 136b (FIG. 4b) to the open configuration 136a (FIG. 4a).

The handle 140 may be used in a traditional manner (i.e., to direct the animal wearing the collar 110, such as during a walk) and/or the handle 140 may be used to couple the leash 130 to an object (e.g., a tree, sign, post, bench, etc.). To couple the leash 130 to the object, the handle 140 is wrapped so that the object is collectively encircled by the handle 140 and the leash 130 and the protrusion 142 is moved to the hold position 142b to restrain the leash 130. For example, the leash 130 may be inserted in the cavity 146 and the protrusion 142 may be moved to extend at least partially across the cavity 146 to restrain the leash 130 in the cavity 142. The leash catch 148 may be moved to the hold position 148b, and the lock 145 may restrict movement of the protrusion 142 from the hold position 142b and movement of the leash catch 148 from the hold position 148b. To separate the animal from the object, the lock 145 may be unlocked (e.g., by entering a proper combination) and the protrusion 142 may be moved to the release position 142a, releasing the leash 130 from the cavity 146.

It is understood that while certain forms of this invention have been illustrated and described, it is not limited thereto except insofar as such limitations are included in the following claims and allowable functional equivalents thereof.

The invention claimed is:
1. A pet restraint system, comprising:
a flexible collar having first and second ends and a plurality of holes therebetween; and a fastener configured to selectively secure together said first and second collar ends to present an adjustable circumference for encircling a portion of a pet, said fastener including:
  a pin configured to respectively insert within said holes to secure said adjustable collar circumference in a plurality of respective positions;
  a clasp configured to secure said pin when at a first position and release said pin when at a second position wherein said clasp is biased toward said first position; and
  an outer casing movable between a closed configuration enclosing said clasp and an open configuration exposing said clasp;
  a lock configured to restrict separation of said first and second collar ends, said lock being operatively coupled to said outer casing to restrict movement of said outer casing from said closed configuration to said open configuration;
wherein said clasp is movable to said second position only when said outer casing is at said open configuration wherein said fastener includes a spring-biased push button operatively engaged with said outer casing to restrict movement of said outer casing from said closed configuration to said open configuration.

2. The pet restraint system of claim 1, wherein:
said collar second end defines a loop;
said fastener includes a hoop;
said hoop interacts with said collar loop to couple said fastener to said collar.

3. The pet restraint system of claim 2, wherein said collar includes a cut-resistant material permanently affixed within an outer member.

4. The pet restraint system of claim 1, further comprising:
an elongate leash having first and second ends;
a clip permanently coupled to said leash first end, said clip being configured to removably attach said leash first end to said collar; and
a second lock configured to restrict removal of said clip from said collar.

5. The pet restraint system of claim 4, wherein:
said clip includes an arm movable between an open configuration and a closed configuration to removably attach said leash first end to said collar;
said second lock is configured to restrict movement of said clip arm from said closed configuration.

* * * * *